UNITED STATES PATENT OFFICE.

HENRY M. POLLARD, OF PROVIDENCE, RHODE ISLAND.

FERTILIZER.

SPECIFICATION forming part of Letters Patent No. 232,756, dated September 28, 1880.

Application filed May 19, 1879.

*To all whom it may concern:*

Be it known that I, HENRY M. POLLARD, of Providence, in the county of Providence and State of Rhode Island, have invented new and useful Improvements in Fertilizers, of which the following is a specification.

The object of this invention is to utilize night-soil as a fertilizer, so that the same will be inodorous and can be handled without offense to the person.

Heretofore great trouble has been experienced in utilizing night-soil as ingredients of a fertilizer on account of the offensive odor thrown off, and of being too strong for the purpose.

My invention is designed to overcome these objections without destroying any of the fertilizing qualities. Therefore it consists in a fertilizer composed of night-soil, umber, sulphuric acid, and sulphate of lime, in combination, as will be hereinafter more fully set out.

To prepare this fertilizer the following process is followed: Take night-soil as it may be found in the vaults, either with or without the presence of urine or water in quantity, and calcined plaster (sulphate of lime) of about equal quantities, then add of pulverized umber to the proportion of one in two hundred, by weight, and of sulphuric acid about one in twenty-five. Thus, in one ton of the mixture of the night-soil and sulphate of lime add ten pounds of umber and about eighty pounds of sulphuric acid. This compost is then thoroughly mixed, and then allowed to stand undisturbed for a short time, when it will solidify. This process of chemical action is readily understood.

Sulphate of lime is sulphuric acid and lime, about fifty-eight one-hundredths acid and forty-two one-hundredths lime. When the acid comes in contact with the ammonia they combine and make a solid substance. The carbonate of ammonia is then sulphate of ammonia and the sulphate of lime is carbonate of lime, there being an exchange of bases. The water in the night-soil is rich in ammonia, and absorbs about six hundred and seventy times its own bulk of carbonate or muriate of ammonia. In this condition the water is absorbed by or combines with the lime in its calcined state, the result being as above described. This compound in this condition requires three hundred parts of water to one of the compound to dissolve and render proper for use as a fertilizer; or, in other words, it will require three hundred pounds of water to dissolve one pound of this compound.

I find in practice that by adding one pound of umber to one hundred pounds of the plaster before mixing with the night-soil, and then mixing the whole, that the solubility of the resulting mass is increased, so that one hundred and fifty volumes of water will dissolve one volume of the compound.

It will be seen that a better result will be attained in a dry season or dry soil if the quantity of umber in the compound be increased, while in a very wet season or wet soil the quantity may be reduced; but I find the proportions set out meet the objects of the invention, and the variation of the quantity of umber for very wet or dry soil will be but slight.

The object of the umber is not alone to make the compound friable, but mainly to make it soluble in a less volume of water. This hardened compost is then broken into pieces for transportation, or it may be ground to a powder ready for use.

I am aware that night-soil has heretofore been treated with sulphuric acid and sulphate of lime for the production of an inodorous fertilizer, and to such invention no broad claim is made in this application; but

What I claim as my invention is—

The fertilizer hereinbefore described, consisting of night-soil, calcined plaster, umber, and sulphuric acid, in or about the proportions named, and substantially as described.

In testimony whereof I have hereunto set my hand this 16th day of May, 1879, in the presence of two witnesses.

HENRY M. POLLARD.

Witnesses:
CHAS. D. BILLINGS,
ALLEN WEBSTER.